United States Patent [19]

Stahl

[11] Patent Number: 4,858,709
[45] Date of Patent: Aug. 22, 1989

[54] DIGITAL SCALE

[75] Inventor: Albrecht Stahl, Sulzbach, Fed. Rep. of Germany

[73] Assignee: Soehnle-Waagen GmbH & Co., Murrhardt, Fed. Rep. of Germany

[21] Appl. No.: 257,814

[22] Filed: Oct. 14, 1988

[30] Foreign Application Priority Data

Oct. 16, 1987 [DE] Fed. Rep. of Germany ....... 3735036

[51] Int. Cl.$^4$ ...................... G01G 23/14; G01G 23/10
[52] U.S. Cl. ...................................... 177/164; 177/185
[58] Field of Search ............. 177/164, 165, 185, 25.13

[56] References Cited

U.S. PATENT DOCUMENTS

| 4,316,516 | 2/1982 | Kupper | 177/185 X |
| 4,535,854 | 8/1985 | Gard et al. | 177/164 X |
| 4,661,920 | 4/1987 | Haze | 177/164 X |

Primary Examiner—George H. Miller, Jr.
Attorney, Agent, or Firm—Jones, Tullar & Cooper

[57] ABSTRACT

The invention relates to a digital scale, in which an analog output signal of a weighing cell is converted in an analog/digital converter into a digital signal. The digital signal is applied to a microprocessor, which compares it with a zero value, derives the weight to be displayed from the comparison and causes it to be displayed in a display device. At regular time intervals, a clock transducer turns the weighing cell on and stores the thus received output signal of the weighing cell in memory in alternation. The output signal most recently ascertained and stored memory is compared with the stored output signal ascertained one time interval previously and, and if the difference exceeds a predetermined threshold is displayed in the display device.

10 Claims, 1 Drawing Sheet

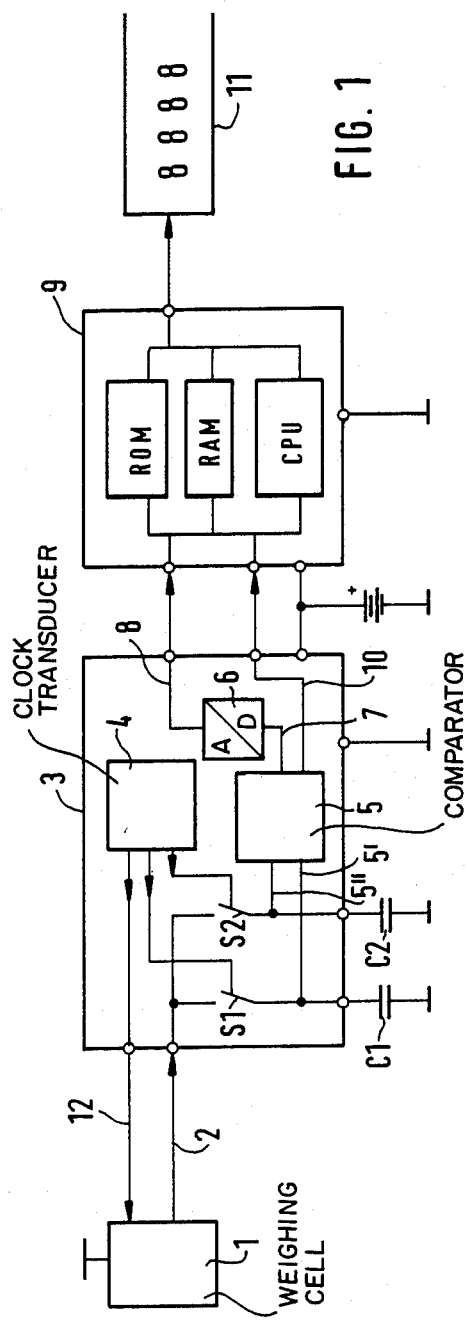
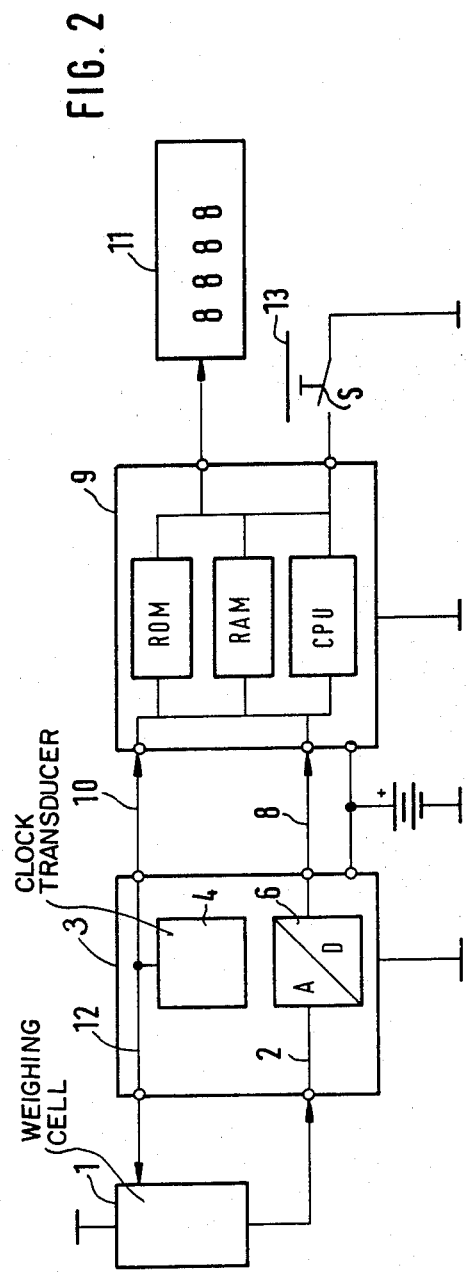
FIG. 1
FIG. 2

DIGITAL SCALE

FIELD OF THE INVENTION

The present invention relates to a digital scale with a weighing cell, the analog output signal of which is converted into a digital signal in an analog/digital converter. The digital signal is supplied to a microprocessor, which compares it with a zero value, derives the weight to be displayed from the comparison and causes it to be displayed on a display device. The zero value is determined prior to the weighing process, after the weighing cell is switched on but as yet is unloaded.

BACKGROUND OF THE INVENTION

Before a person stands on such a scale to be weighed, he must turn the scale on using a switch. This may be a foot-actuated switch on the face end of the scale or it can be done by briefly putting a load on the scale. In the latter case, however, the scale must first be unloaded again without weighing taking place. If the scale is turned on but is still unloaded, that is, still prior to the actual weighing process, then the "zero value" required for evaluation, or in other words, the value to be assigned to the output signal of the weighing cell in the unloaded state, is first ascertained. Then the zero value is displayed, for instance as 0000. Only then can the actual weighing process begin. The zero value is then subtracted from the value ascertained. The difference is converted by the microprocessor and displayed as the weight.

A disadvantage in these known digital scales is that they must first be turned on, and then there must be a waiting period, for instance, one or two seconds long, before a person can weigh himself. On the other hand, the scale must be turned on for zero value determination prior to the weighing, because otherwise the weighing cell and the microprocessor would use up the batteries too fast, if they used current continuously (the weighing cell uses 3 mA, the microprocessor 0.5 to 1 mA, at 3 V).

SUMMARY OF THE INVENTION

It is an object of the present invention to provide a digital scale of the above stated type such that it can be loaded immediately to form the zero value, without having to turn it on and then wait for a period prior to weighing, and that the weight can be displayed immediately. In other words, a digital scale should have the same convenience as an analog scale in terms of the properties of immediate loadability and immediate display, yet without having to be manually adjusted to zero prior to weighing.

One way to attain this object is to have a clock transducer turn the weighing cell on at regular time intervals, have the output signal received in this process from the weighing cell stored in alternation in two memories, with the most recently ascertained output signal stored in one memory being compared with the output signal ascertained one time interval previously and stored in the other memory, with the signal representing this difference, if the difference exceeds a predetermined threshold, applied to the microprocessor, and with the value represented by the signal being displayed on the display device.

Another way to ascertain this object is to have a clock transducer turn the weighing cell and the microprocessor on at regular time intervals, with the value ascertained from the thus received output signal of the weighing cell being stored in the working memory of the microprocessor, the switch being closed in the weighing process, with the value thus ascertained by the weighing cell and microcomputer being compared with the most recently ascertained value in a switching process tripped by the clock transducer, and with the difference being displayed on the display device.

According to the present invention, scanning of the current-consuming elements (weighing cell, optionally including a microprocessor) by means of a clock transducer at regular intervals, where the present value is processed as the actual measured value, and the value measured on time interval previously, or in other words the most recently measured value prior to this value, is considered to be a zero value. A usable "zero point" is accordingly always available in memory. The current-consuming circuit units accordingly need not be supplied with current continuously, but rather only during the brief scanning operations.

At the same time, the following advantages are attained: The "ON" switch to be actuated by foot in known digital scales is dispensed with. The intended circuit can be embodied as a circuit specific to this application (customized circuit) and thus is capable of being integrated. Both these features afford economies in terms of cost. Omitting the "ON" switch increases the reliability.

Exemplary embodiments of the present invention and their advantageous further features will now be described in detail, referring to the accompanying drawings.

BRIEF DESCRIPTION OF THE DRAWINGS

FIG. 1 is a block diagram illustrating a first exemplary embodiment of the present invention, and FIG. 2 is a block diagram illustrating a second exemplary embodiment of the present invention.

DESCRIPTION OF THE PREFERRED EMBODIMENTS

The circuit diagrams should be understood as solely schematic, rather than as complate layouts of the electric current path in them. A weighing cell 1 is supplied with current via the line 12 and emits an analog output signal to an adaptation circuit 3 via the line 2. The adaptation circuit 3 has a clock transducer 4, a comparator 5 and an analog/digital converter 6. The clock transducer 4 operates continuously. It applies voltage to the line 12 at regular time intervals of approximately one second, or in other words establishes the connection of the weighing cell 1 to the current supply, for brief periods which are approximately 2 to 10 ms. long. The clock transducer also closes switches S1 and S2 in alternation at the same time intervals. If the switch S1 is closed, then via the line 2 the capacitor C1 is subjected to the output signal of the weighing cell 1 and thus stores the corresponding voltage value in memory; if the switch S2 is closed, then the capacitor C2 is subjected via the line 2 to the output signal of the weighing cell 1 and thus then stores the corresponding voltage value in the capacitor C2. The capacitors C1 and C2 are connected to the inputs 5' and 5" of the comparator 5.

Thus at time $t_1$, the switch S1 is for instance closed and the output signal is stored in C1; in the ensuing time $t_2$, S2 is closed and the output signal is stored in C2. In the next time $t_3$, the output signal is stored in C1 again, and so forth.

The overall process is as follows: A voltage is present at one of the capacitors C1, C2, which is equivalent to the most recently measured value of the analog output signal of the weighing cell 1, while at the other of the capacitors a voltage is always present that is equal to the value of the analog output signal of the weighing cell 1 from one time interval previously. That is, if $t_1$ is the present time of a measurement, then the measured values are always present at time $t_i$ and $t_{i-1}$. C1 and C2 here have the function of analog memories.

Both values are present at the inputs 5', 5" of the comparator 5 and are compared with one another; that is, if no weighing has taken place, than the values at the inputs 5' and 5, 5" will be the same, or if there is a brief slight change because of environmental influences or a change of location, approximately the same. In that case, nothing further happens.

However, if upon a comparison in the comparator 5 a difference exceeding a predetermined adjustable or programmable threshold occurs, then this is evaluated as a sign that loading of the weighing cell 1 or in other words a weighing process has been initiated. The output signal of the weighing cell 1 at the current time $t_i$, with which one of the capacitors (for instance, C1) is acted upon, is interpreted as the measured signal produced upon weighing, while the output signal still stored in the other capacitor (for instance, C2), in the most recently preceding time $t_{i-1}$ is interpreted as a zero value. The signal corresponding to the difference proceeds via the line 7 to the analog/digital converter 6 and from there via the line 8 to the evaluation circuit 9. At the same time, if the aforementioned threshold is exceeded by a difference signal, the evaluation circuit 9 is switched on (that is, its current supply is switched on) via line 10; the evaluation circuit 9 is embodied as a microprocessor, which includes a read-only memory (ROM), a working memory or random access memory (RAM), and a central processing unit (CPU). The operating program is stored in ROM. The continuously produced values are stored in the working memory RAM. The calculating operations are performed by the CPU. The evaluation circuit 9, based on the serial-bit data on line 8 at the output of the analog/digital converter 6, ascertains the value to be assigned to the weight in decimal form and causes it to be displayed on the display device 11.

As already mentioned, the clock transducer 4 runs continuously. It needs a current of only a few A. This is extremely low, so that since the clock transducer is the only element that is switched on continuously, it does not represent any significant load to the supply of current, furnished by a battery, to the entire circuit. Thus the "ON" switch of known digital scales can be omitted; this means an economy in terms of cost and increases reliability.

The capacitances of the capacitors C1, C2 are, for instance, 100 nF.

The exemplary embodiment of FIG. 2 differs from that of FIG. 1 in that the storage in memory of the scanned measured values takes place completely digitally at the program level in the microprocessor 9, at a specific memory site in the working memory RAM. Storage of the values ascertained at the scanning times $t_i$ and $t_{i-1}$ takes place in alternation at two specific memory sites of the working memory RAM. Accordingly, the measured value scanned most recently at time $t_i$ is stored at a given time.

The consumption of current of the circuit of FIG. 2 is somewhat greater than that of the circuit of FIG. 1 because the evaluation circuit 9 is switched on along with the clock transducer. For this reason, it is suitable in this circuit to provide longer intervals between two scanning operations, for example intervals of approximately one hour. Upon weighing, there is no wait for the next scanning by the clock transducer 4 (as there is in FIG. 1); instead, the scanning takes place by means of a switch S, which is actuated when the person being weighed steps onto the plate 13, at the instant of a weighing process. Thus a "present" measurement is brought about, which then produces the temporally "newest" value, while the value most recently ascertained by scanning by the clock transducer 4 is used as a zero value.

In both embodiments the current consumption is so low that it can be furnished by solar cells in combination with a buffer accumulator without a battery, because of the brightness of the surroundings during weighing. However, the buffer accumulator is needed in order to have energy available for the circuit over the time in which there is little or no light falling on it.

What is claimed is:

1. A digital scale, comprising:
    a weighing cell which generates an analog output signal;
    an adaptation circuit including a clock transducer connected to the weighing cell, memory means connected to the clock transducer and to the weighing cell, a comparator connected to said memory means, and a analog/digital converter connected to said comparator;
    said clock transducer causing the weighing cell to be energized at regular time intervals generating thereby corresponding analog signals applied to said memory means, wherein said analog signals are stored in alternation and in subsequent time intervals, the stored signals being compared to each other and to a predetermined threshold value and an output signal generated when the predetermined threshold value is exceeded, said output signal being applied to said analog/digital converter;
    an evaluation circuit connected to said adaptation circuit for receiving the output signal converted by said analog/digital converter, said evaluation circuit ascertaining the decimal value to be assigned to the output signal converted by said analog/digital converter; and
    a display device connected to the evaluation circuit for displaying the decimal value.

2. The digital scale as defined in claim 1, wherein said memory means comprises two capacitors and two switches, each capacitor being connected to said clock transducer by a respective switch, said switches being connected to the weighing cell by said clock transducer in alternation.

3. The digital scale as defined in claim 1, wherein said comparator and said analog/digital circuit are connected to said evaluation circuit, said comparator serving to switch on said evaluation circuit when the predetermined value is exceeded.

4. The digital scale as defined in claim 1, wherein the time intervals are between 0.5 to 10 seconds.

5. The digital scale as defined in claim 1, wherein the time intervals are 1.0 seconds.

6. The digital scale as defined in claim 1, further comprising:

a solar energy cell with a buffer memory used as a power source.

7. A digital scale, comprising:
a weighing cell which generates an analog output signal;
an adaptation circuit including a clock transducer connected to the weigh cell, and an analog/digital converter connected to the weighing cell;
said clock transducer causing the weighing cell to be energized at regular time intervals generating thereby corresponding analog signals applied to said analog/digital converter;
a switch;
an evaluation circuit connected to said switch and to said adaptation circuit for receiving the output signal converted by said analog/digital converter, said evaluation circuit including memory means, in which said analog signals are stored in alternation and in subsequent time intervals, and wherein when the weighing cell and the evaluation circuit are turned on by said switch and said weighing cell is unloaded, a predetermined threshold value is provided, said stored signals being compared to said predetermined threshold value, and when said predetermined threshold value is exceeded, an output signal is provided, the decimal value of which is ascertained by said evaluation circuit; and
a display device connected to the evaluation circuit for displaying the decimal value.

8. The digital scale as defined in claim 7, wherein the time intervals are between 10 to 100 minutes.

9. The digital scale as defined in claim 7, wherein the time interval are 60 minutes.

10. The digital scale as defined in claim 7, further comprising:
a solar energy cell with a buffer memory used as a power source.

* * * * *